United States Patent [19]
Plasse et al.

[11] Patent Number: 6,000,663
[45] Date of Patent: *Dec. 14, 1999

[54] SUPPORT APPARATUS FOR FLORAL DESIGNERS

[76] Inventors: Paul A. Plasse; Merryl D. Plasse, both of 197 Cedar St., Lexington, Mass. 02173

[*] Notice: This patent is subject to a terminal disclaimer.

[21] Appl. No.: 09/085,466

[22] Filed: May 27, 1998

Related U.S. Application Data

[63] Continuation-in-part of application No. 08/756,987, Nov. 26, 1996, Pat. No. 5,833,178
[60] Provisional application No. 60/048,641, Jun. 5, 1997.

[51] Int. Cl.[6] .................................................. A47G 7/00
[52] U.S. Cl. .................... 248/27.8; 248/447; 248/456; 248/462
[58] Field of Search ................... 248/27.8, 105, 248/106, 107, 163.2, 176.1, 447, 454, 455, 456, 462, 447.2, 910; 47/41.01, 41.11, 41.12, 41.13

[56] References Cited

U.S. PATENT DOCUMENTS

| | | | |
|---|---|---|---|
| 4,226,256 | 10/1980 | Hawley | 248/910 |
| 5,810,313 | 9/1998 | Armstrong | 248/346.2 |
| 5,833,178 | 11/1998 | Plasse et al. | 248/27.8 |

Primary Examiner—Derek J. Berger
Assistant Examiner—Gwendolyn Baxter
Attorney, Agent, or Firm—Perkins, Smith & Cohen, LLP; Jacob N. Erlich, Esq.; Jerry Cohen, Esq.

[57] ABSTRACT

A support apparatus for floral designers having a work piece frame support for removably securing a workpiece thereon. The work piece frame support including at least one component for preselectively holding the workpiece in a preselected orientation. A support member, the work piece frame support being pivotally secured to the support member proximate one end thereof. A clamping mechanism operably interposed between work piece frame support and the support member for locking the work piece frame support at a preselected angular relationship with respect to the support member. The work piece frame support and the clamping mechanism being collapsible to a position substantially within the support member in order to provide for a compact arrangement when the support apparatus is not in use.

13 Claims, 9 Drawing Sheets

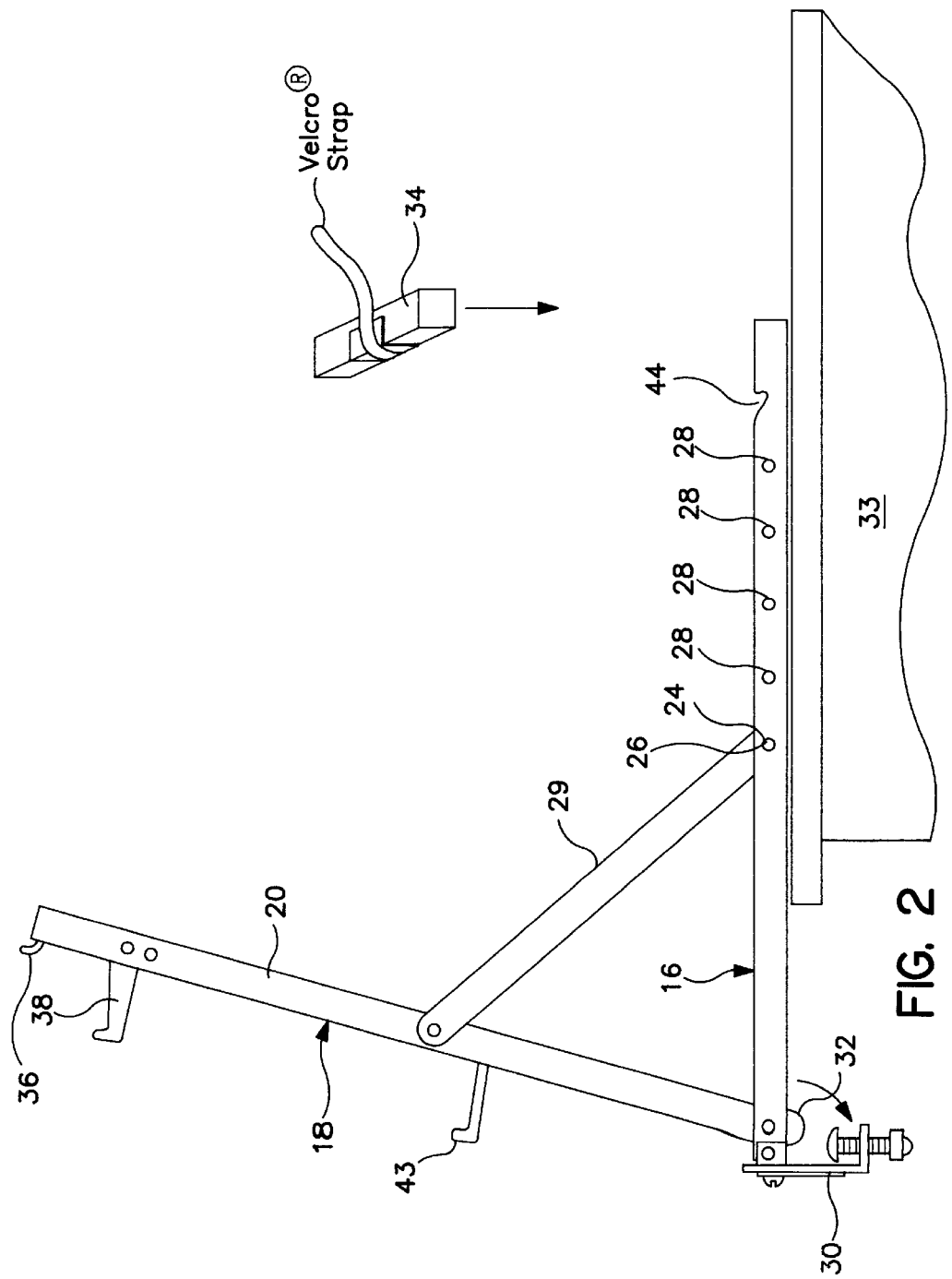

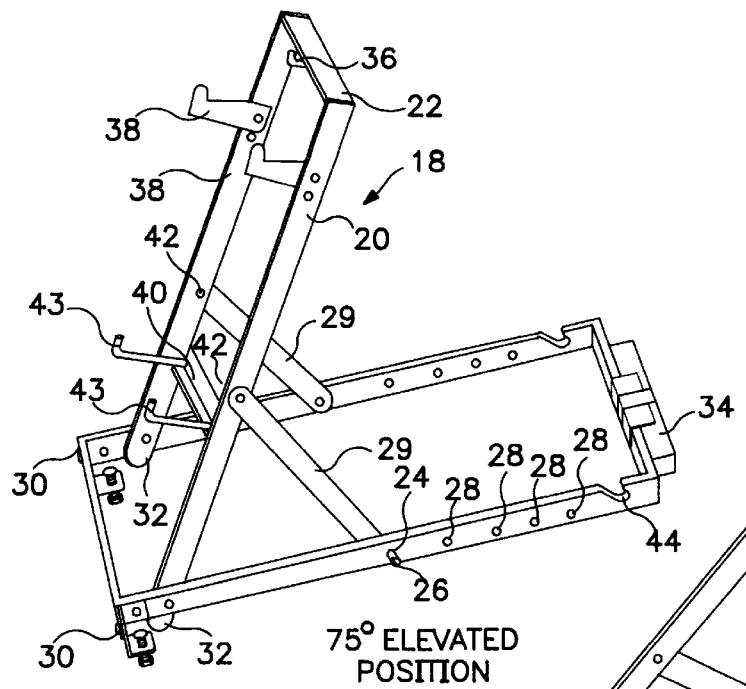
FIG. 3A  75° ELEVATED POSITION
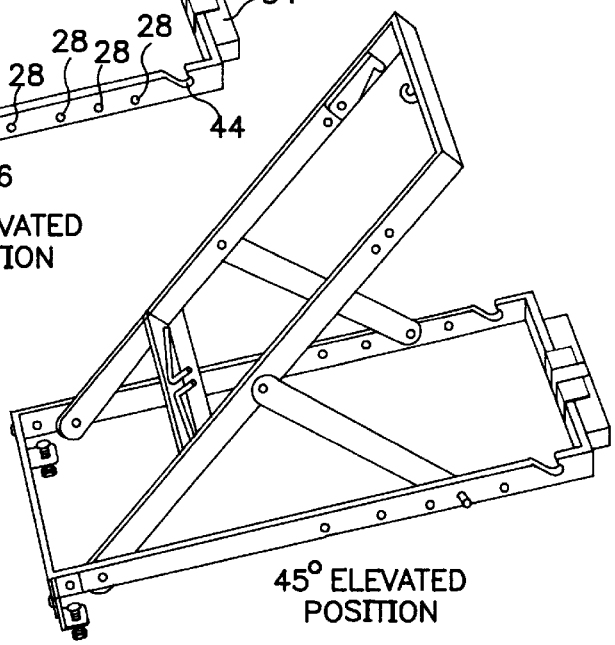
FIG. 3B  45° ELEVATED POSITION
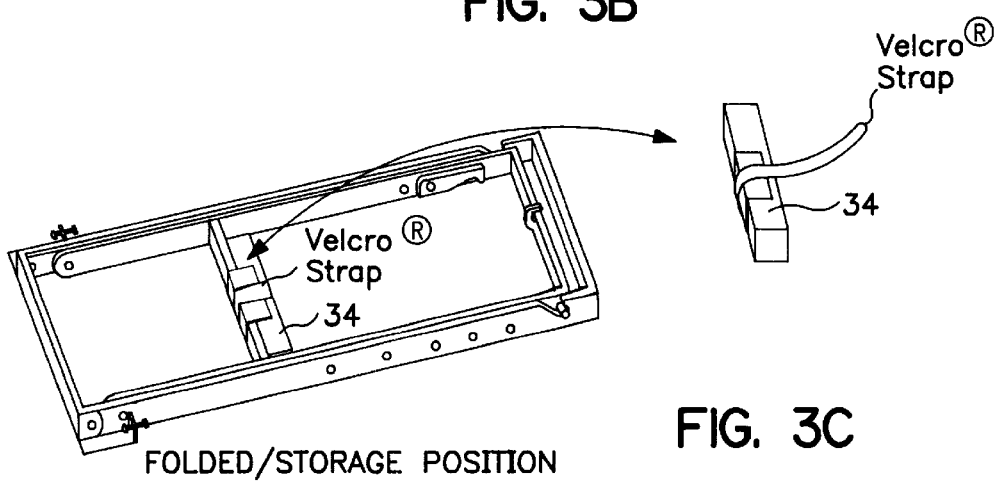
FIG. 3C  FOLDED/STORAGE POSITION

SUPPORT APPARATUS FOR FLORAL DESIGNERS

CROSS REFERENCE TO RELATED APPLICATIONS

This application is continuation-in-part of co-pending U.S. application Ser. No. 08/756,987 filed Nov. 26, 1996 entitled SUPPORT APPARATUS FOR FLORAL DESIGNERS and now U.S. Pat. No. 5,833,178 and also claims priority of U.S. Provisional Application Serial No. 60/048,641 filed Jun. 5, 1997 entitled SUPPORT APPARATUS FOR FLORAL DESIGNERS both by the current inventors.

BACKGROUND OF THE INVENTION

This invention relates generally to holders or supports and, more particularly, to a support apparatus to be utilized by floral designers during the preparation of floral arrangements or for display purposes.

It is well recognized throughout the floral industry that it is extremely difficult and time consuming to design and create certain types of floral arrangements and pieces, particularly those types of floral arrangements which are related to hanging sprays, crosses and hearts for funeral arrangements, as well as various types of wreaths and swags for home and commercial decor. Such types of arrangements are generally prepared and held in place within a foam block of the type described in U.S. Pat. No. 4,058,929 to Donald L. O'Connell which supports the various types of flowers making up the floral arrangement. As illustrated in the above-identified patent and in U.S. Pat. No. 3,962,825 to George C. Thompson, the foam blocks utilized for securing in place and displaying the floral arrangement is generally held in position in a hollow tray-like base member which forms a water-confining receptacle for supporting the foam block.

Construction of the floral arrangements of the kind described above, generally involves placing a substantial number of various types of flowers and other types of floral pieces within this foam block. In the past this floral construction process took place in a horizontal position, on a work bench or the like. Consequently the floral designer was subjected not only to discomfort while constructing the floral arrangement, but also to an unusual viewing angle of the floral arrangement during its construction. Furthermore, since many of the floral arrangements made, for example, for purposes of funerals and/or other type of home or commercial displays are quite large, in most circumstances the work space in which the floral designer works to make such large designs is quite cramped even further adversely effecting the construction process.

Alternatively, in the past, the construction of such large floral designs have also taken place on either vertically upstanding wall hooks or easel-like configured stands. These types of support structures, presently used by floral designers and florists have proven to be extremely unsatisfactory. For example, constructing such floral arrangements on a wall hook using a spray bar filled with water-soaked foam, permits water to run out of the foam and onto the floor rather than into the spray bar holder reservoir because of the awkward and substantially vertical position in which the piece is being constructed. Positioning a floral arrangement for construction in less than a vertical position utilizing blocks or shims generally prohibits the insertion of the flowers, greens or other floral pieces at the top of the foam. Easel-like devices have also proven to be ineffective in assisting a floral designer in the construction of floral arrangements of the types specified above. More specifically, these easel-like devices have not been capable of preventing the worked upon piece from moving vertically or horizontally during the construction process.

In cases where the floral materials are flowers or greens which have thick stems such as gladiolas, birds of paradise, ginger, stock, snap dragons, teepee, etc., the insertion of these stems require a substantial amount of force. Therefore, holding the floral piece in place while attempting to insert such stems substantially slows the designer's progress during the production of such floral displays. Furthermore, the florist or designer can crush the materials already in place during the construction process. It is readily apparent there is lacking in the floral design industry an adequate support apparatus for use by floral designers during the construction of various types of floral arrangements.

It is therefore an object of this invention to provide a support apparatus for floral designers which enables the designer to quickly and efficiently construct and prepare a substantial number of different types of floral arrangements.

It is therefore a further object of this invention to provide a support apparatus for floral designers which provides the designer with an appropriate angle of vision to view the work during the construction process.

It is another object of the invention to provide a support apparatus for floral designers which permits the designer to effectively maximize the amount of force necessary for the insertion of floral pieces into the foam utilized for floral support.

It is still another object of this invention to provide a support apparatus for floral designers which is highly compact, relatively light weight and which can be easily transported from one location to another.

It is an even further object of this invention to provide a support apparatus for floral designers which substantially reduces water drippage problems during the construction of floral designs.

It is still another object of this invention to provide a support apparatus readily adaptable to accommodate a number of different types of objects thereon.

SUMMARY OF THE INVENTION

The present invention provides a support apparatus, particularly useful by floral designers, which overcomes the problems associated with past support apparatus utilized in the construction of floral arrangements. Furthermore, the present invention is capable of being utilized not only for the support of an object, but also for its viewing.

The support apparatus of the present invention is made up of a base or support member having pivotally connected thereto a work piece frame support. The work piece frame support is held in position with respect to the base in a plurality of different angular positions by a pair of support legs also pivotally connected to the base or frame member. During use, a floral designer will secure a workpiece to the work piece frame support. Generally, although not limited thereto, the work piece is in the form of a water confining foam block and receptacle/holder upon which the floral arrangement is produced and mounted.

By utilizing the support apparatus of this invention the floral designer is provided with an acceptable working and/or viewing level. The work piece frame support has a number of different supporting members associated therewith to accommodate a wide variety of work pieces. In addition, it is possible to selectively, angularly position the work piece frame support with respect to the horizontal to enable different sized individuals to work therewith.

In order to prevent the support apparatus from moving with respect to a work bench upon which the support apparatus is mounted, the support apparatus includes a unique clamping arrangement or mechanism. This clamping arrangement includes a pair of clamps which work in conjunction with the lower portion of the work piece frame support to lock the support apparatus in place upon a support surface such as a work bench. To prevent tilting and to effect a suitable clamping action of the support apparatus during construction of a floral arrangement or the like, a counterweight is affixed adjacent the rear portion of the base.

After use, the components of the support apparatus of this invention can be neatly folded in place in a collapsed position within the base or support member for easy storage in a minimal amount of space.

For a better understanding of the present invention, together with other and further objects, reference is made to the following description taken in conjunction with the accompanying drawings, and its scope will be pointed out in the appended claims.

BRIEF DESCRIPTION OF THE DRAWINGS

FIG. 2 is a side elevation view showing in detail the various components of the support apparatus of the present invention;

FIGS. 3A, 3B and 3C are pictorial representations

DETAILED DESCRIPTION OF THE PREFERRED EMBODIMENT

Figure 3D:
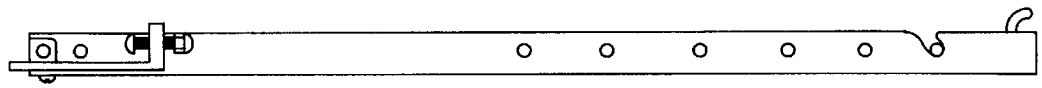
FIGS. 3D, 3E and 3F are side elevational views illustrating the various components of the support apparatus of this invention in different positions of storage and use.
Figure 3E:
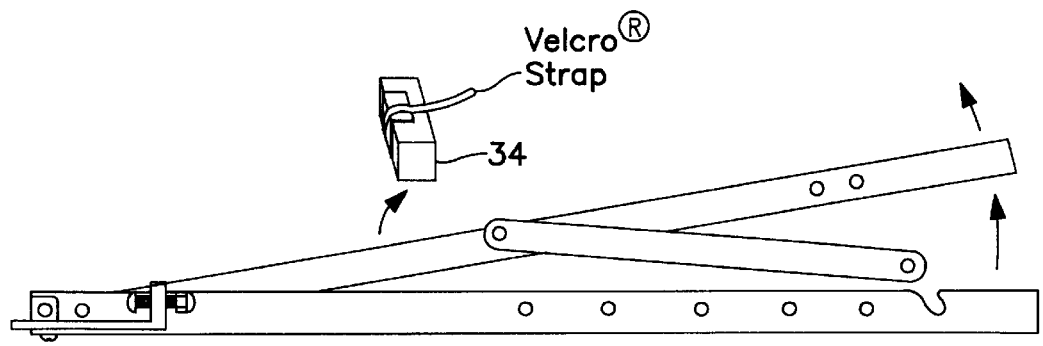

Reference is now made to FIGS. 1–7 of the drawings which clearly illustrate the support apparatus 10 of the present invention shown in the fully extended operational position in FIGS. 1, 2, 3A, 3B, 3F, 4A, 4B, 5, 6, and 7 of the drawings as well as the collapsed position of FIGS. 3C and 3D and an intermediate position of FIGS. 3B and 3E. As shown in the figures, support apparatus 10, is designed to support an object such as a flower arrangement receptacle/holder 12 (shown in FIG. 4A) in an ergonomically correct position with respect to a floral designer 14 (shown in FIG. 5). It should be realized that although the support apparatus is primarily designed to be used by floral designers to support floral arrangements, it is also capable of being used to support other types of objects. The floral designer 14 can utilize support apparatus 10 not only during the construction of a floral arrangement but also for viewing the floral arrangement during construction as well as for display purposes.

More specifically, support apparatus 10 is made up of a base or support member 16 preferably having a frame-like configuration which, although shown open in the center portion thereof in order to enable the support apparatus 10 to be light weight, could also be constructed of a solid block of material. Base 16 can be made of any suitable material such as aluminum, sturdy plastic or the like. At the front end of the base or support member 16 is a work piece frame support 18 pivotally secured at one end thereof to base or support frame 16. Although not limited thereto, the work piece frame support 18 preferably includes a pair of upstanding legs 20 held in a spaced-apart relationship with one another by at least one rigid cross member 22.

Figure 5:
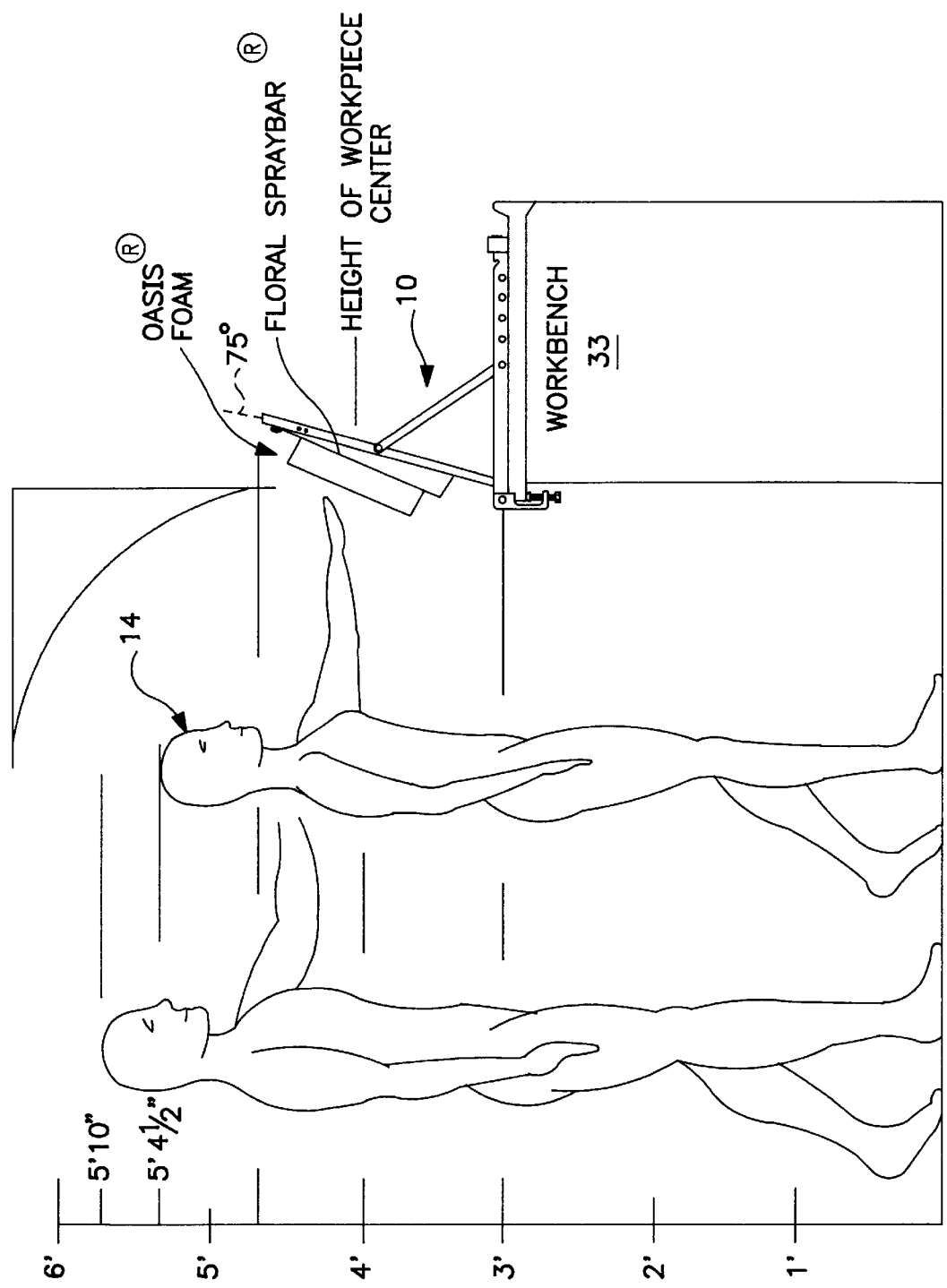
FIG. 5 illustrates in pictorial fashion the utilization of the support apparatus of the present invention by individuals of varying height.

As pointed out above, the work piece frame support 18 is pivotally secured to the base or support frame 16 so that it may be folded into a compact position within the base or support frame 16 as illustrated in FIGS. 3C and 3D of the drawings when not in use. During use work piece frame support 18 is extended to an upstanding operational position as shown in FIGS. 1, 2, 3A, 3B, 3F, 4A, 4B, 5, 6 and 7 of the drawings. In this upstanding position support apparatus 10 supports a work piece, preferably in the form of a floral arrangement which is designed and constructed by a floral designer. Optimally, in the upstanding position, the work piece frame support 18 is positioned approximately 65–75 degrees with respect to the horizontal. This angular relationship with respect to the horizontal may vary (between 30–75 degrees. for example) in accordance with the scope of the present invention and, as shown in FIGS. 1–7 of the drawings, can be locked in other angular positions (shown in FIG. 4B by the phantom lines) by the insertion of a pin 24 which is attached to support arm 29 within aligned openings 26 and 28 in base member 16, respectively. After adjusting the clamp 30 spacing and attaching the counterweight 34, the alternate locking positions enable the present invention to be utilized by individuals of varying size as shown in FIG. 5 of the drawings.

Figure 6:
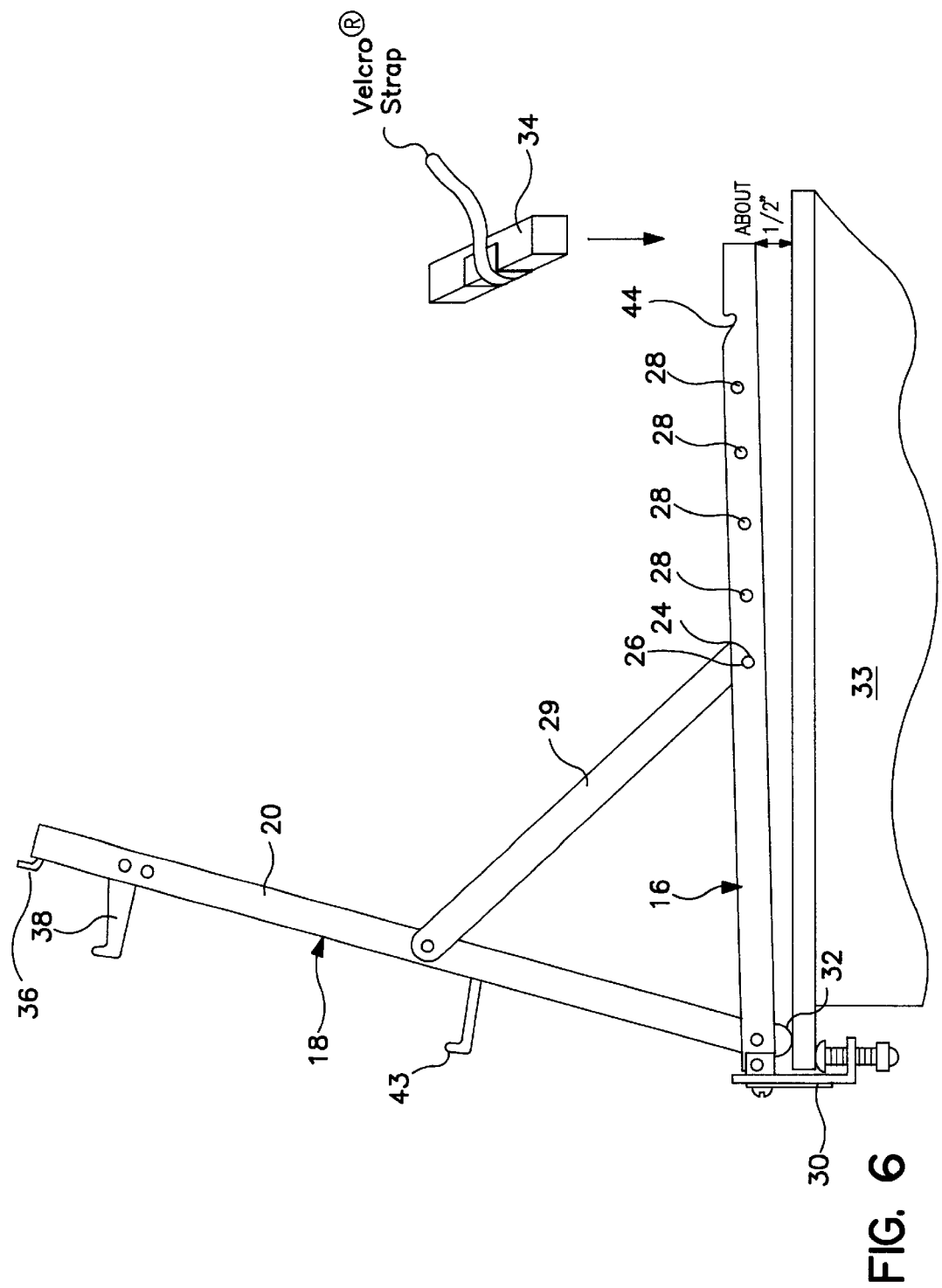
FIGS. 6 and 7 are side elevational views of the support apparatus illustrating positioning the device on a work bench.
Figure 7:
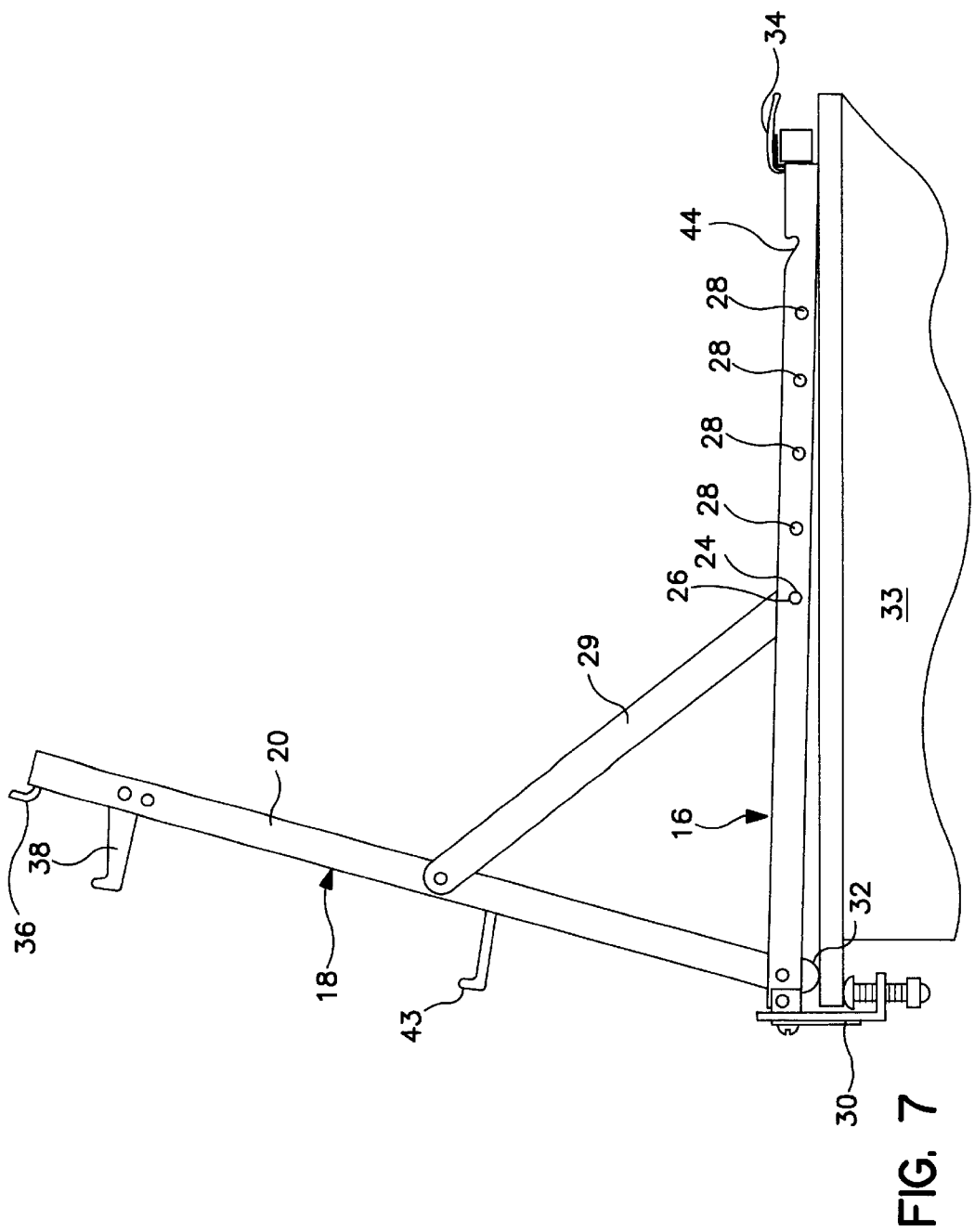

The counterweight 34 can be made of any conventional material of sufficient weight, preferably approximately two pounds, to counterbalance the support 10 even when supporting a heavy floral arrangement. In addition counterweight 34 is utilized in the manner described hereinbelow with respect to FIGS. 6 and 7 to aid in the positive locking of the support apparatus 10 with respect to a work bench 33. Counterweight 34 also includes a locking mechanism for removably securing the counterweight 34 to cross member 40 when not in use and thereafter to secure the counterweight to the end of base 16 as shown in FIGS. 6 and 7. A conventional fastening device such as a Velcro® strap can be utilized in conjunction with the counterweight 34 to prevent the disengagement of counterweight 34 from base 16 either in its stored position as shown in FIG. 3C or in its operative position as shown in FIG. 7.

Any other suitable locking mechanism can also be used with this invention to lock work piece frame support 18 in a preselected angular position with respect to the horizontal. It has been found, however, that in order to present an ergonomically compatible structure for utilization by floral designers a 75 degree positioning of the work piece frame support with respect to the horizontal provides the least amount of strain on the floral designer 14 of average height during use. Taller floral designers and/or certain floral pieces may find a lower angle to be more advantageous.

Continuing with the description of the upstanding legs 20, it is clearly illustrated in FIGS. 1, 2, 3A, 3B. 3F, 4A, 4B, 6 and 7 of the drawings that the bottom-most ends of each of the upstanding legs 20 protrudes a preselected distance beyond the base 16 in order to lock the support 10 to a work bench 33 (shown in FIGS. 4A, 4B and 5–7) when operated in conjunction with a pair of clamps 30 in a manner described hereinbelow. Further, associated with bottom most ends of legs 20 are slightly resilient or compliant end pieces 32 which exhibit a high coefficient of friction.

As shown in FIGS. 1–7 of the drawings, at the front end of the base frame 16, a pair of adjustable clamps 30 are pivotally secured to the base frame member 16. The clamps 30 are utilized in conjunction with the end pieces 32 of work piece frame support 18 so as to removably secure the support apparatus 10 of the present invention to a work bench and, as also described above, to prevent undesirable movement of support apparatus 10 during the construction of a floral arrangement.

The clamps 30 can also be pivoted to an out of the way position as shown in FIGS. 3C, 3D, 3E and 3F when not in use. When in use, clamps 30 can be pivoted into a substantially vertical position with respect to the substantially horizontal base support frame 16 and adjusted to accommodate a wide range of bench top thicknesses Each clamp can have a stop associated therewith such that when clamps 30 are fully extended and after adjusting and placement of the counterweight 34 they cooperate with the compliant end pieces 32 associated with each upstanding leg 20 to secure the support apparatus 10 in place with respect to a work bench.

Figure 3F:
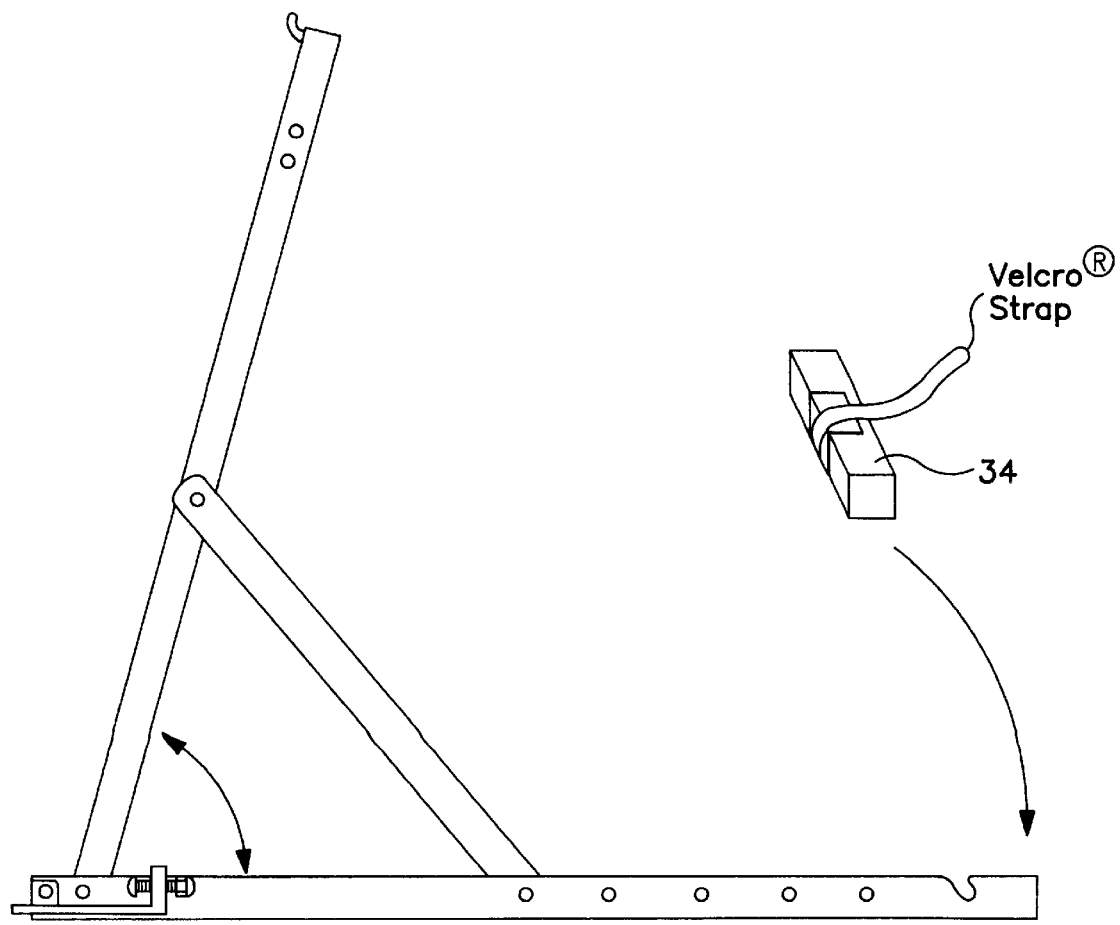
Figure 4A:
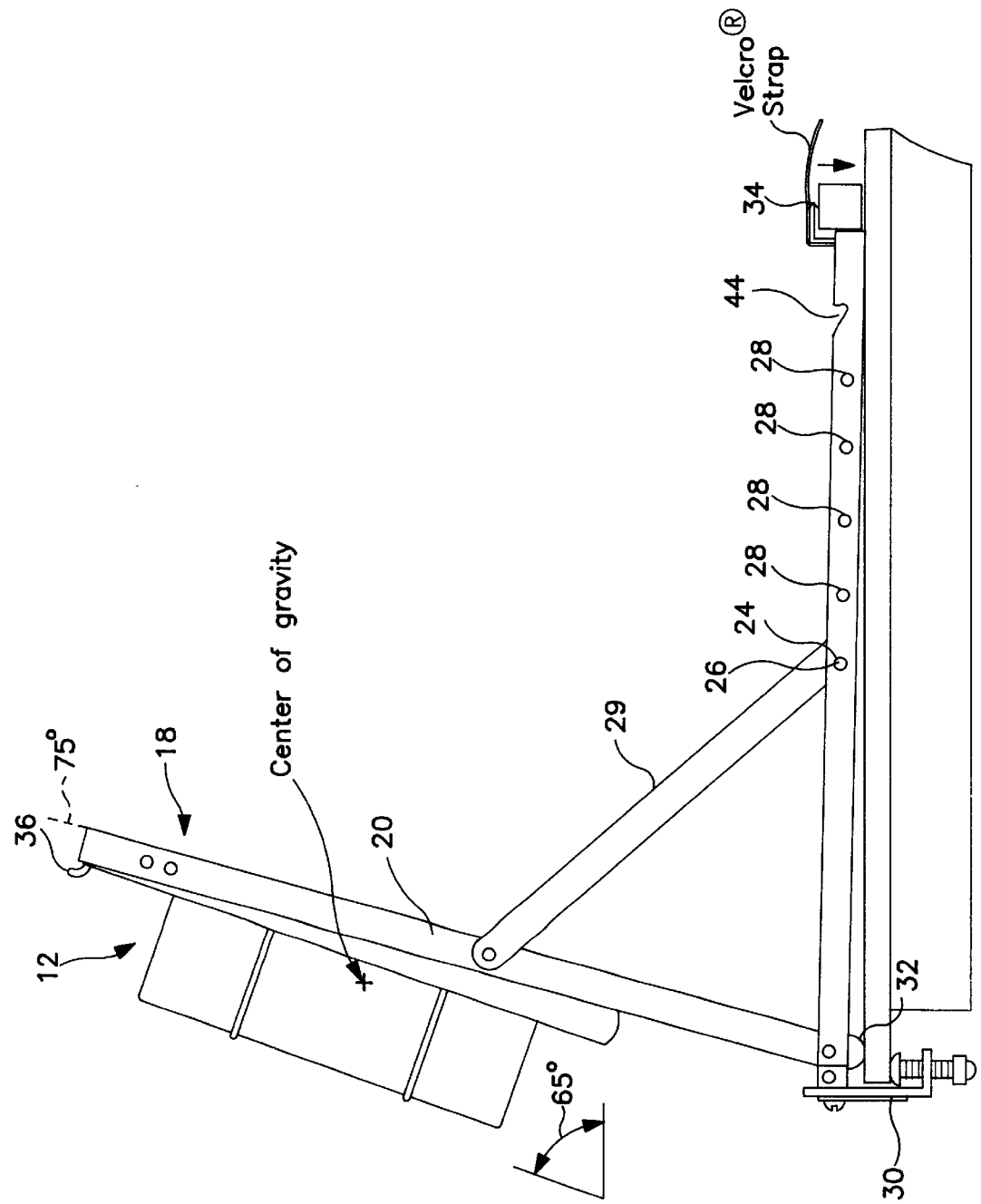
FIGS. 4A and 4B are side elevational views of the support apparatus of this invention illustrating a foam block utilized for supporting flower arrangements in place upon a hollow tray-like receptacle held in position within the support apparatus of this invention.
Figure 4B:
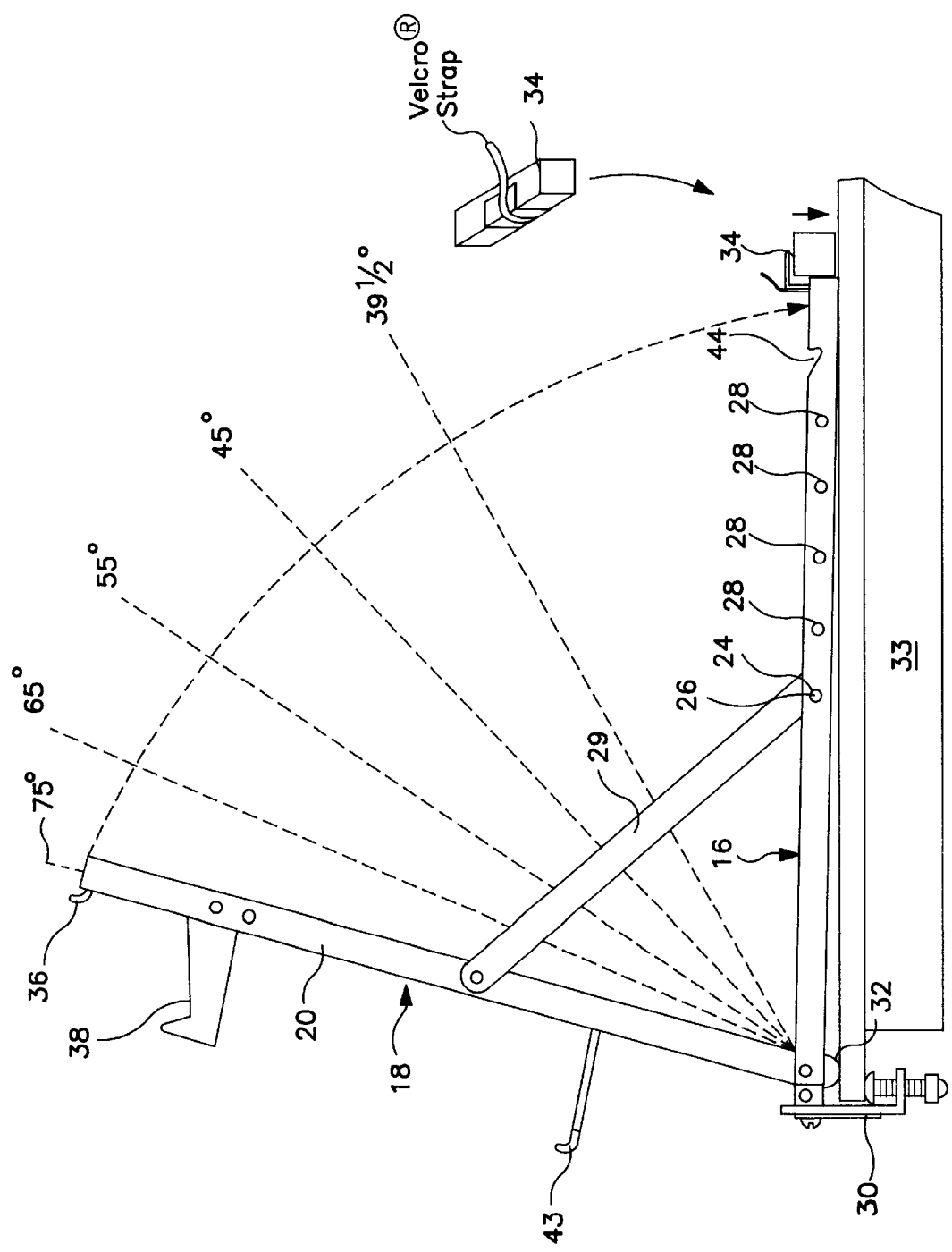

Referring once again to the workpiece frame support 18, in order to secure the upstanding legs 20 in their operational position, a pair of support legs 29 are pivotally secured at one end at various points of base or support frame 16 by the use of attached protruding pins 24 on the support legs 29 and at the other end thereof to the upstanding legs 20, respectively. These support legs 29 operate as illustrated in FIGS. 1, 2, 3E, 3F and 4A–7 in conjunction with locking pin 24. For example, in its compact and nonusable position (FIGS. 3C and 3D) the workpiece frame support 18 is pivoted to rest within base or frame member 16 and the pins 24 are placed in the undercut latching slots 44. FIGS. 3D–3F shows how the upstanding legs 20 are lifted into an operational position.

As described above, it is preferable that the locked operational position of the workpiece frame support 18 is approximately 75 degrees with respect to the horizontal. In order to further maintain the support apparatus 10 in position during use and prevent tilting thereof during construction of a floral arrangement any suitable counter weight 34 can be removably secured to the base or frame member 16. Since tilting of the support apparatus 10 is undesirable, with the present invention, the floral designer can work upon a floral arrangement without fear of the device tilting or falling on the floor.

Referring once again to the work piece frame support 18, the work piece frame support 18 also includes a support post 36 fixedly secured to the central portion of the cross member 22. Post 36 can be utilized to support a water-confining foam block and receptacle/holder 12 of the type illustrated in U.S. Pat. Nos. 3,962,825 and 4,058,929.

In addition, when, under certain circumstances, a wreath or cross display or other such object is utilized with the present invention, two pair of auxiliary supports 38 and 43 are pivotally secured to the upper and lower sections of upstanding legs 20, respectively, of work piece frame support 18. Auxiliary supports 38 and 43 lock in a position substantially perpendicular to the work piece support 18 in order to further support various floral arrangements. When not needed, these auxiliary supports 38 and 43 can be pivoted inwardly and out of the way for future use.

Figure 1:
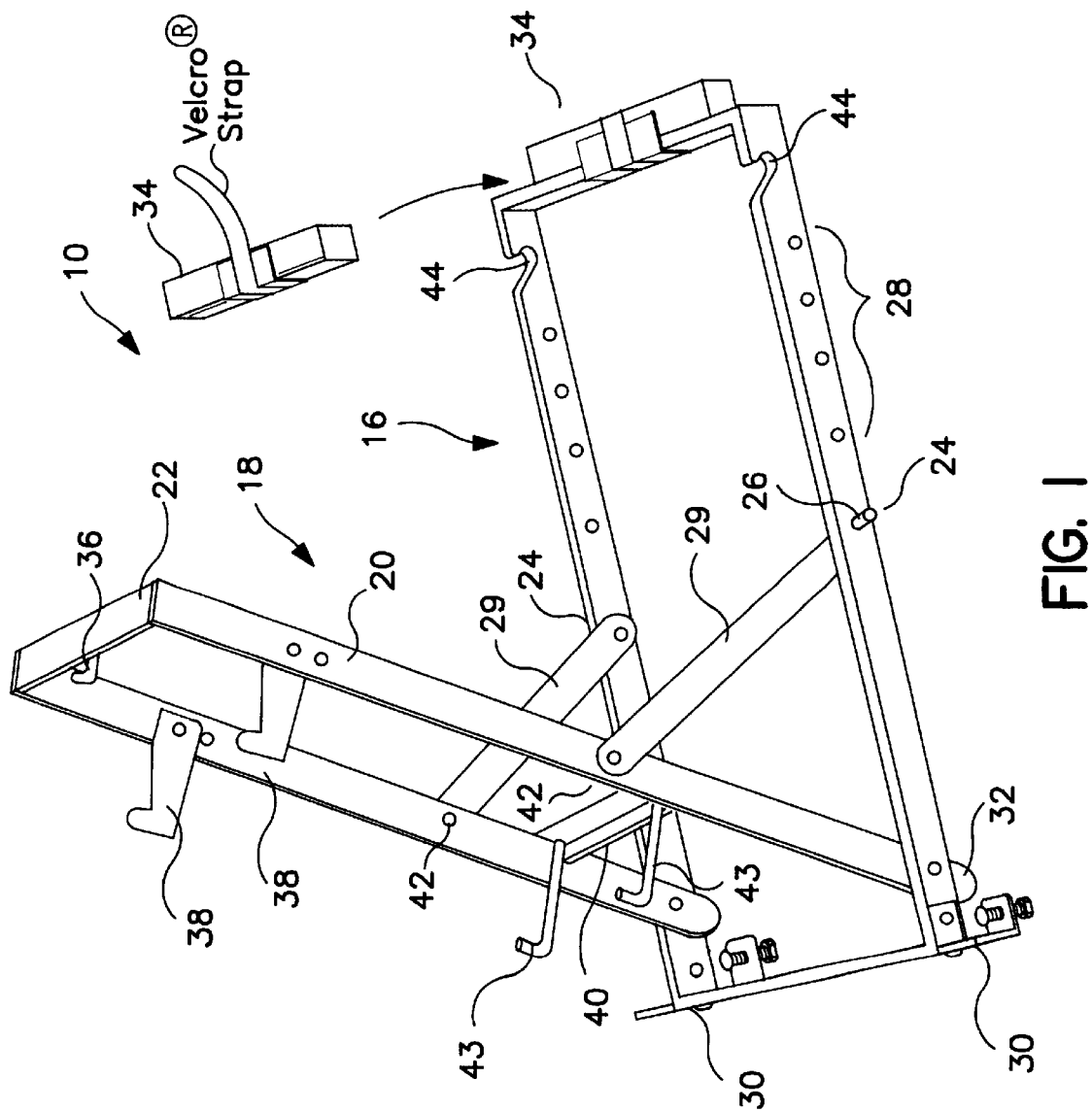
FIG. 1 is a pictorial representation of the support apparatus of this invention.

Even further, the work piece support 18 can include a secondary support cross member 40 shown in FIG. 1. Cross member 40 is utilized either independently or in conjunction with the other support means to help support a heavy floral arrangement. In addition, cross member 40 strengthens the work piece frame support 18.

As shown in FIG. 1 of the drawings, the upstanding legs 20 include opposed protruding rivet ends 42 which are utilized to capture the sides of a floral support device therebetween. These protruding rivet ends 42 are provided to accommodate slight variations in size of the receptacle/holder 12, or, in the alternative, may be a type of holding mechanism which can be independently adjustable to accommodate receptacle/holders of even larger varying sizes.

As stated above, although the primary usage of the support apparatus 10 of the present invention is in aiding floral designers during the construction or viewing of floral arrangements, support apparatus 10 can also be utilized by other types of individuals such as hobbyists, sculptors, etc. in supporting or viewing a workpiece or finished product.

MODE OF OPERATION

The use of the floral support apparatus 10 of this invention is provided below. For example, when a floral designer 14 is ready to construct a floral design of the type generally associated with certain floral pieces such as hanging sprays, crosses and hearts, wreaths and swags, etc. for commercial and home decor, the floral designer 14 will remove the collapsed support apparatus 10 from storage and mount the support apparatus 10 on a work bench 33. This is accomplished by moving the workpiece frame support 18 to its operative position, properly adjusting and engaging the clamps 30 beneath the edge of a work bench as shown in FIG. 2, 6 and 7.

More specifically, the support apparatus, with the support frame 18 in its operative position, is clamped to the work bench 33 by tightening clamps 30 until the end of base 16 lifts approximately ½ inch above the work bench surface as shown in FIG. 6. Thereafter, after counterweight 34 has been removed from its stored position, the counterweight 34 is affixed to the extreme end of the base frame 16 forcing the base frame 16 downward against the top surface of the work bench 33. This action will fixedly clamp the support 10 against the work bench as the end pieces 32 forcibly engage the work bench as shown in FIG. 7. Counter weight 34 maintains support apparatus 10 on the work bench and prevents tilting thereof even when a heavy floral arrangement is supported thereon or worked upon.

The work piece frame support 18 is held in its desired inclined position and locked in place by support legs 29. As pointed out above, the adjusting of the clamp 30 openings and the attachment of the counterweight 34 sets in motion the clamping action which secures the work support 10 to the work bench top.

The floral piece or other such object is supported on the work piece frame support 18 either by hanging on the support post 36, by hanging from the auxiliary supports 38, utilizing auxiliary supports 43 or resting on the cross member 40. In order to further secure the work piece in position on the work piece frame support 18, the work piece or floral design is positioned within the protruding rivets or pins 42 thereby restricting its lateral movement for work thereon.

The particular inclined angle of the work piece frame support 18 (preferably 65–75 degrees with respect to the horizontal) permits the floral designer easy access to the floral work piece for work thereon. In addition, this inclination not only permits designer to work on the piece, but also permits simultaneous viewing of the floral arrangement during the preparation of the arrangement.

Utilization of the support apparatus 10 of the present invention enables a florist or floral designer to maximize his or her time in preparing the floral work piece or arrangement. The use of this invention further substantially reduces stress generally associated with the preparation of large cumbersome floral arrangements.

After use the support apparatus 10 may be maintained in a fixed relationship with the work bench for further use or may be easily removed from the workbench. To remove the support apparatus the user merely has to remove the counterweight 34 and slide the support apparatus from the work bench. The clamps will remain preadjusted for future attachment to a work bench having the same thickness overhang. Adding the counterweight will once again create a strong mounting arrangement of the support apparatus 10 with respect to the work bench. Other sized overhangs would require readjustment of the clamps prior to adding counterweight 34.

After use the support apparatus 10 may then be folded back into the inoperative position shown in FIGS. 3C and 3D and easily stored in a minimal amount of space. When the pins 24 are engaged in the latching slots 44, during the folding operation, the undercut slots 44 capture the pins 24 and complete the closure. The counterweight 34 may be conveniently stored by removably attaching it to the cross-member 40.

Although this invention has been described with reference to particular embodiments, it will be understood that this invention is also capable of further and other embodiments within the spirit and scope of the appended claims.

What is claimed is:

1. A support apparatus for use by floral designers during construction of a floral arrangement, comprising:

means for removably securing an object thereon;

a support member, said object securing means being pivotally connected proximate one end of said support member;

means for locking said object securing means at a preselected angular relationship with respect to said support member;

said object securing means being made of a frame-like member having a pair of elongated elements having at least one cross-member to secure said elongated elements in a spaced apart relationship to one another, each of said pair of elongated elements being pivotally connected to said support member and having an end portion thereof extending a predetermined distance below said support member, and said support member having a front portion extending beyond each of said elongated elements when said object securing means is positioned at said preselected angular relationship with respect to said support member;

means connected to the one end of said support member adjacent the pivotal connection of said elongated elements to said support member for removably clamping said support member to a support structure in cooperation with said end portion of each of said pair of elongated elements; and means removably attached to said cross-member for preventing the support apparatus from tipping when said means for preventing tipping is removed from said cross member and connected proximate an other end of said support member thereby maintaining the other end of said support member in place with respect to the support structure while a floral designer is working on a floral arrangement mounted in operative position on the support apparatus.

2. The support apparatus as defined in claim 1 wherein said means for preventing said support apparatus from tipping comprises a weighted member having an attaching element thereon for removably attaching said weighted member to said cross member and the other end of said support member.

3. The support apparatus as defined in claim 2 wherein said weighted member is of a predetermined weight, said predetermined weight being sufficient to aid in cooperation between said clamping means and said end portion of each of said pair of elongated elements and position said support member against the support structure.

4. The support apparatus as defined in claim 1 wherein said means for locking said object securing means at the preselected angular relationship with respect to said support member comprises a pair of rigid members, each rigid member being pivotally connected at one end thereof to said frame-like member and having locking pins at the other end thereof, said support member having means for removably engaging said locking pins therein in order to maintain said object securing means at said preselected angular relationship with respect to said support member.

5. The support apparatus as defined in claim 4 wherein said support member includes a pair of latching slots for engaging said locking pins when said object securing means is pivoted into a collapsed position within said support member when said support apparatus is not in use.

6. The support apparatus as defined in claim 1 wherein said clamping means comprises an adjustable clamping mechanism.

7. A support apparatus for use by floral designers during construction of a floral arrangement, comprising:

means for removably securing an object thereon;

a support member, said object securing means being pivotally connected proximate one end of said support member;

means for locking said object securing means at a preselected angular relationship with respect to said support member;

said object securing means being made of a frame-like member having a pair of elongated elements having at least one cross-member to secure said elongated elements in a spaced apart relationship to one another, each of said pair of elongated elements being pivotally connected to said support member and having an end portion thereof extending a predetermined distance beyond said support member when said object securing means is positioned at said preselected angular relationship with respect to said support member;

means connected to the one end of said support member adjacent the pivotal connection of said elongated elements to said support member for removably clamping said support member to a support structure in cooperation with said end portion of each of said pair of elongated elements;

said object securing means and said clamping means being collapsible to a position substantially within said support member in order to provide for a compact arrangement when said support apparatus is not in use; and means removably attached to said cross-member for preventing the support apparatus from tipping when said means for preventing tipping is removed from said cross member and connected proximate an other end of said support member thereby maintaining the other end of said support member in place with respect to the support structure while a floral designer is working on a floral arrangement mounted in operative position on the support apparatus.

8. The support apparatus as defined in claim 7 wherein said support member having a front portion extending beyond each of said elongated elements when said object securing means is positioned at said preselected angular relationship with respect to said support member.

9. The support apparatus as defined in claim 2 wherein said means for preventing said support apparatus from tipping comprises a weighted member having an attaching element thereon for removably attaching said weighted member to said cross member and the other end of said support member.

10. The support apparatus as defined in claim 9 wherein said weighted member is of a predetermined weight, said predetermined weight being sufficient to aid in cooperation between said clamping means and said end portion of each of said elongated elements and position said support member against the support structure.

11. The support apparatus as defined in claim 2 wherein said means for locking said object securing means at the preselected angular relationship with respect to said support member comprises a pair of rigid members, each rigid member being pivotally connected at one end thereof to said frame-like member and having locking pins at an other end thereof, said support member having means for removably engaging said locking pins therein in order to maintain said object securing means at said preselected angular relationship with respect to said support member.

12. The support apparatus as defined in claim 11 wherein said support apparatus includes a pair of latching slots for engaging said locking pins when said object securing means is pivoted into a collapsed position within said support member when said support apparatus is not in use.

13. The support apparatus as defined in claim 7 wherein said clamping means comprises an adjustable clamping mechanism.

* * * * *